US010695867B2

(12) United States Patent
Etter et al.

(10) Patent No.: US 10,695,867 B2
(45) Date of Patent: Jun. 30, 2020

(54) CONTROLLING MICROSTRUCTURE OF SELECTED RANGE OF LAYERS OF OBJECT DURING ADDITIVE MANUFACTURE

(71) Applicant: GENERAL ELECTRIC COMPANY, Schenectady, NY (US)

(72) Inventors: Thomas Etter, Muhen (CH); Matthias Hoebel, Windisch (CH); Felix Martin Gerhard Roerig, Baden (CH)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 15/915,406

(22) Filed: Mar. 8, 2018

(65) Prior Publication Data

US 2019/0275613 A1    Sep. 12, 2019

(51) Int. Cl.

| B23K 26/342 | (2014.01) |
|---|---|
| B23K 26/34 | (2014.01) |
| B33Y 10/00 | (2015.01) |
| B33Y 30/00 | (2015.01) |
| B23K 26/082 | (2014.01) |
| B23K 26/06 | (2014.01) |
| B23K 26/10 | (2006.01) |
| B23K 26/03 | (2006.01) |
| B23K 26/0622 | (2014.01) |

(52) U.S. Cl.
CPC ......... *B23K 26/342* (2015.10); *B23K 26/032* (2013.01); *B23K 26/0622* (2015.10); *B23K 26/0626* (2013.01); *B23K 26/0665* (2013.01); *B23K 26/082* (2015.10); *B23K 26/10* (2013.01)

(58) Field of Classification Search
CPC ............ B23K 26/32; B23K 26/34–342; B23K 26/082; B23K 26/0668; B23K 26/0622; B23K 26/0626; B33Y 10/00; B33Y 30/00
See application file for complete search history.

(56) References Cited

U.S. PATENT DOCUMENTS

| 5,904,890 A | 5/1999 | Lohner et al. |
|---|---|---|
| 8,172,562 B2 | 5/2012 | Mattes |
| 9,073,265 B2 | 7/2015 | Snis |
| 9,676,033 B2 | 6/2017 | Hellestam |
| 9,789,563 B2 | 10/2017 | Elfstroem et al. |

(Continued)

FOREIGN PATENT DOCUMENTS

| WO | 2015120168 A1 | 8/2015 |
|---|---|---|
| WO | 2016169785 A1 | 10/2016 |
| WO | 2017091505 A1 | 6/2017 |

*Primary Examiner* — Michael A Laflame, Jr.
(74) *Attorney, Agent, or Firm* — James Pemrick; Hoffman Warnick LLC

(57) ABSTRACT

Controlling microstructure in an object created by metal powder additive manufacturing is disclosed. During additive manufacturing of one or more objects using an irradiation beam source system, for each respective layer in a selected range of layers including a cross-sectional area of the one or more objects including the selected object, a duration controller controls actuation of each irradiation device to maintain constant a sum of: an irradiation device melting time, an irradiation device idle time, and a recoating time expended applying a new powder material layer, while otherwise maintaining all other operation parameters of each irradiation device constant.

18 Claims, 6 Drawing Sheets

(56) References Cited

U.S. PATENT DOCUMENTS

| | | | |
|---|---|---|---|
| 2016/0114427 A1* | 4/2016 | Eibl | B23K 26/354 |
| | | | 419/7 |
| 2016/0167303 A1 | 6/2016 | Petelet | |
| 2016/0250717 A1 | 9/2016 | Kruger et al. | |
| 2016/0271884 A1 | 9/2016 | Herzog | |
| 2016/0279872 A1 | 9/2016 | Paternoster | |
| 2017/0102689 A1 | 4/2017 | Khajepour et al. | |
| 2017/0320165 A1* | 11/2017 | Hyakumura | G01B 11/00 |
| 2017/0320264 A1 | 11/2017 | Herzog et al. | |
| 2018/0345382 A1* | 12/2018 | Roychowdhury | B22F 7/064 |

* cited by examiner

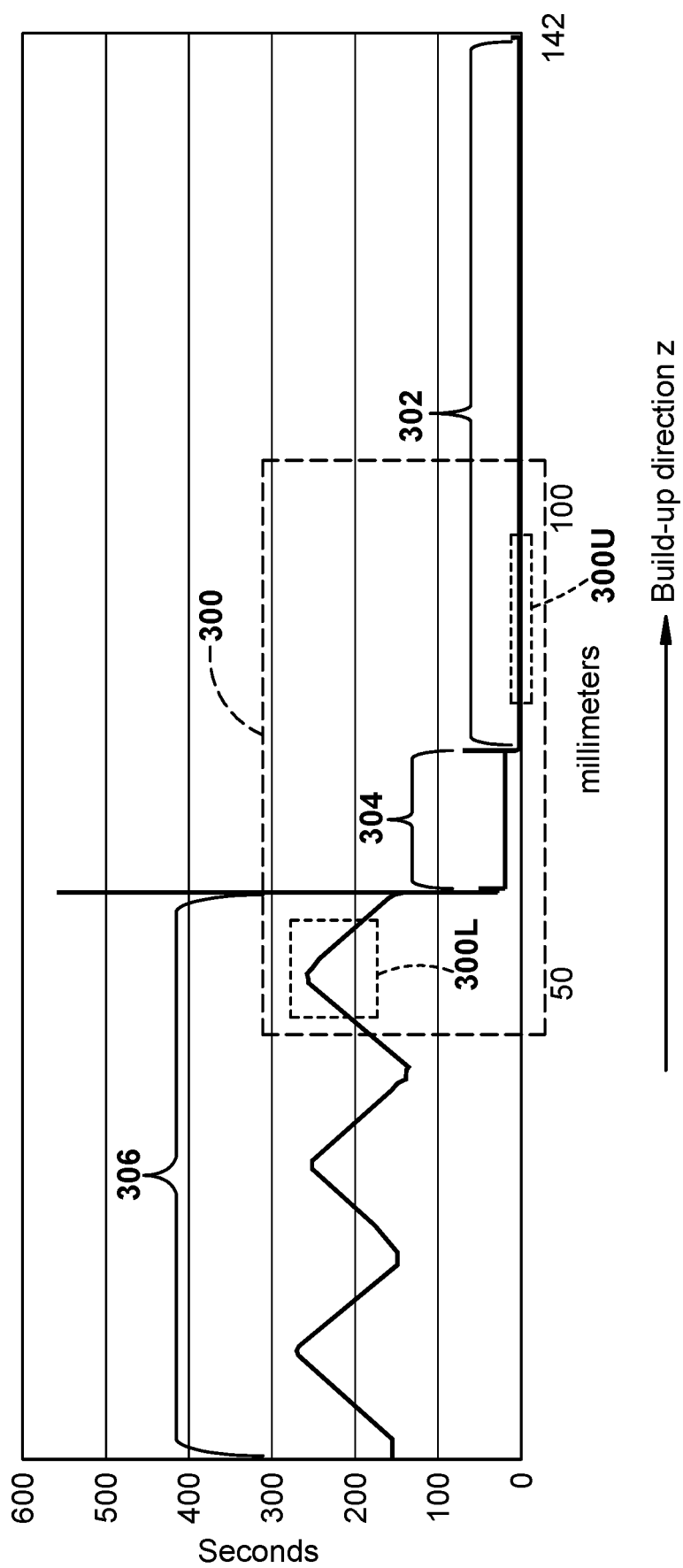

CONTROLLING MICROSTRUCTURE OF SELECTED RANGE OF LAYERS OF OBJECT DURING ADDITIVE MANUFACTURE

BACKGROUND OF THE INVENTION

The disclosure relates generally to additive manufacturing, and more particularly, to a method of controlling microstructure of a selected range of layers of an object during additive manufacture based on the sum of: a melting time, an idle time and a recoating time, of each layer in the range, while maintaining other operation parameters constant.

The pace of change and improvement in the realms of power generation, aviation, and other fields has accompanied extensive research for manufacturing objects used in these fields. Conventional manufacture of metallic, plastic or ceramic composite objects generally includes milling or cutting away regions from a slab of material before treating and modifying the cut material to yield a part, which may have been simulated using computer models, e.g., in drafting software. Manufactured objects which may be formed from metal can include, e.g., airfoil components for installation in a turbomachine such as an aircraft engine or power generation system.

Additive manufacturing (AM) includes a wide variety of processes of producing an object through the successive layering of material rather than the removal of material. As such, additive manufacturing can create complex geometries without the use of any sort of tools, molds or fixtures, and with little or no waste material. Instead of machining objects from solid billets of material, much of which is cut away and discarded, the only material used in additive manufacturing is what is required to shape the object.

Additive manufacturing techniques typically include taking a three-dimensional computer aided design (CAD) file of the object to be formed, electronically slicing the object into layers, e.g., 18-102 micrometers thick, and creating a file with a two-dimensional image of each layer, including vectors, images or coordinates. The file may then be loaded into a preparation software system that interprets the file such that the object can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the object.

In metal powder additive manufacturing techniques, such as direct metal laser melting (DMLM) (also referred to as selective laser melting (SLM)), metal powder layers are sequentially melted together to form the object. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two-dimensional slice of the object geometry can be fused by selectively melting the metal powder. The melting may be performed by a high power melting beam, such as an ytterbium fiber laser of 50 W to 2000 W output power, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two-dimensional layer, and the process repeats until the object is completely formed. In order to create certain objects faster, some metal additive manufacturing systems employ more than one high power laser that work together to form an object or objects.

One challenge with certain additive manufacturing processes, such as DMLM, is that the objects have different microstructures compared to conventionally cast material of the same alloy. The different microstructures are caused by the high energy beam and un-melted material interaction leading to high cooling rates and very fast solidification during these additive manufacturing processes. The issue can be observed between additively manufactured objects versus conventionally cast materials, and can also be observed within individual objects where using the same additive manufacturing operation parameters across an entire object can lead to inhomogeneous microstructure and material properties within the object. In many cases, a heat treatment must be carried out after additive manufacturing in order to adjust the microstructure of the part and to reduce/eliminate residual stresses. However, the vast differences in microstructure cannot always be homogenized by a heat treatment and result in inhomogeneous material properties.

Current additive manufacturing processes attempt to address the situation in a number of ways. One approach attempts to create a largely homogeneous temperature profile. This approach may enable beam melting only when a temperature is below a threshold, or may control beam characteristics such as scanning speed, size of focal point, laser pulse frequency, laser pulse duration and/or laser power, to achieve the homogeneous temperature profile. Alternatively, other approaches may call for a shorter than maximum scan line, and/or provide a time sink before and/or after a scan line, so the time period between adjacent scan lines is constant throughout the article. This time sink however does not fully address inhomogeneous material vertically in an object. Another approach adjusts a traveling speed of the beam along each scan line as a function of the length of the line, e.g., decreasing speed with increasing length of line, to reduce hot spots. Each of these approaches require a complex control algorithm that requires temperature monitoring and real-time adjusting of a number of operation parameters within each layer and across layers.

BRIEF DESCRIPTION OF THE INVENTION

A first aspect of the disclosure provides a method for controlling microstructure in a selected object created by metal powder additive manufacturing (AM), the method comprising: providing an AM system including an AM printer having an irradiation beam source system for manufacturing the selected object by successive solidification of metal powder material layers using irradiation on positions corresponding to a cross-sectional area of one or more objects in each layer including the selected object, the irradiation beam source system including at least one irradiation device for irradiating portions of each metal powder material layer to form the one or more objects in each layer including the selected object, each irradiation device separately actuatable to irradiate the metal powder material; and during additive manufacturing using the irradiation beam source system, for each respective layer in a selected range of layers including a cross-sectional area of the one or more objects including the selected object, controlling actuation of each irradiation device to maintain constant a sum of: an irradiation device melting time, an irradiation device idle time, and a recoating time expended applying a new powder material layer, while otherwise maintaining all other operation parameters of each irradiation device constant.

A second aspect of the disclosure provides an additive manufacturing (AM) system, the (AM) system comprising: an irradiation beam source system for manufacturing one or more objects including a selected object by successive solidification of metal powder material layers using irradiation on positions corresponding to a cross-sectional area of the one or more objects in each layer, the irradiation beam source system including at least one irradiation device for irradiating portions each metal powder material layer to form the one or more objects in each layer including the selected object, each irradiation device separately actuatable to irradiate the metal powder material; and a duration controller controlling actuation of each irradiation device, for each respective layer in a selected range of layers including a cross-sectional area of the one or more objects including the selected object, controlling actuation of each irradiation device to maintain constant a sum of: an irradiation device melting time, an irradiation device idle time, and a recoating time expended applying a new powder material layer, while otherwise maintaining all other operation parameters of each irradiation device constant.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 shows a chart indicating an irradiation device melting time per layer versus build-up direction height (Z) of the objects of FIG. 4.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within an additive manufacturing system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1:
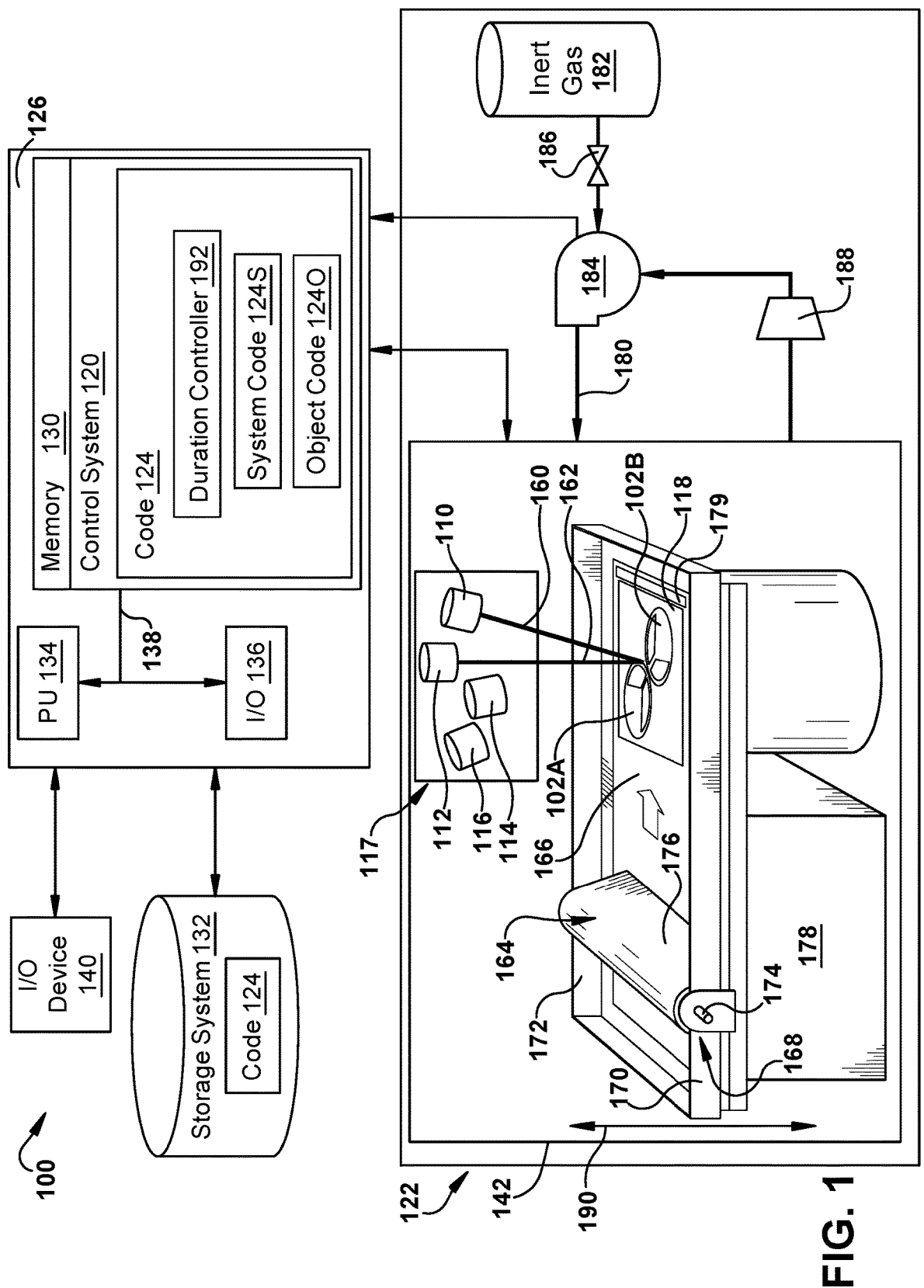
FIG. 1 shows a block diagram of an additive manufacturing system and process including a non-transitory computer readable storage medium storing code representative of an object according to embodiments of the disclosure.
Figure 2:
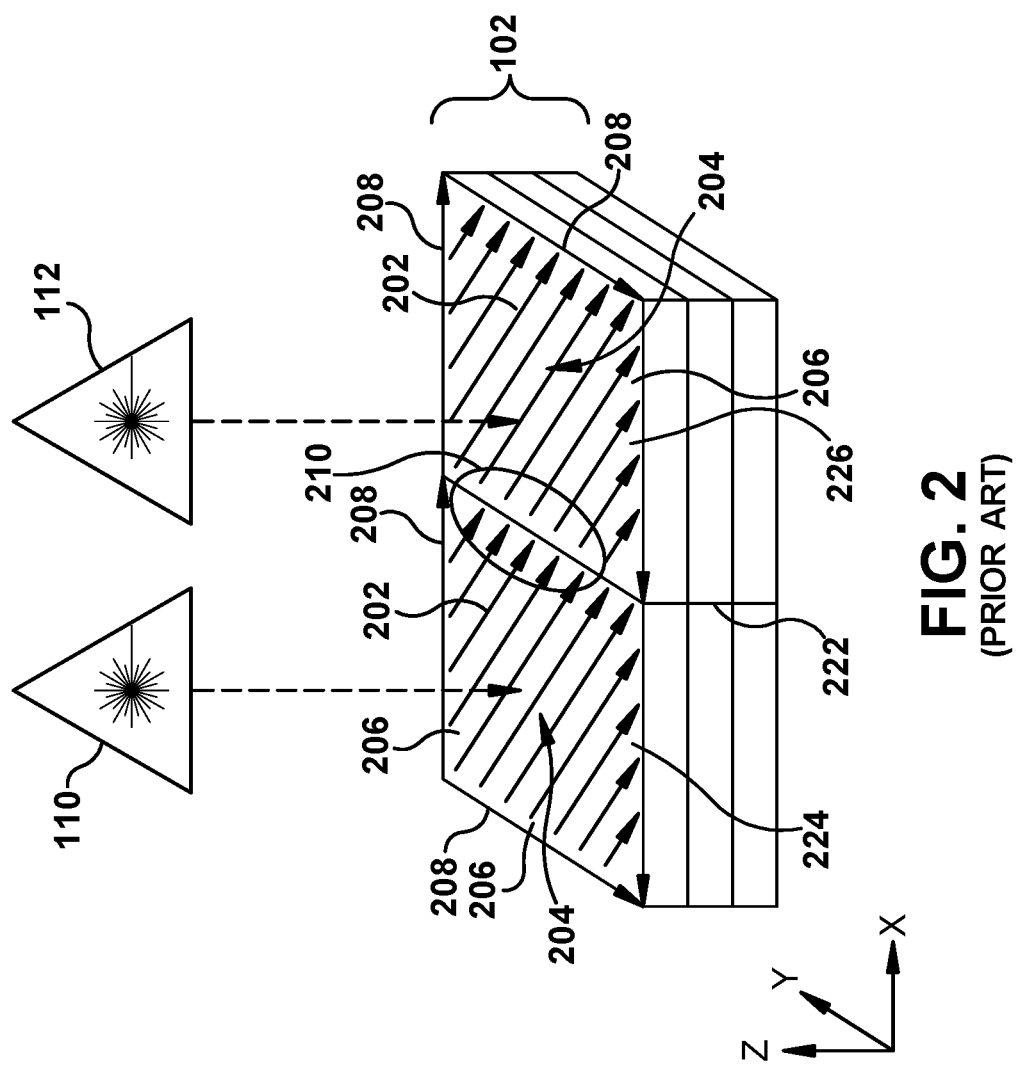
FIG. 2 shows a schematic perspective view of a two irradiation device additive manufacturing system building an object.
Figure 3:
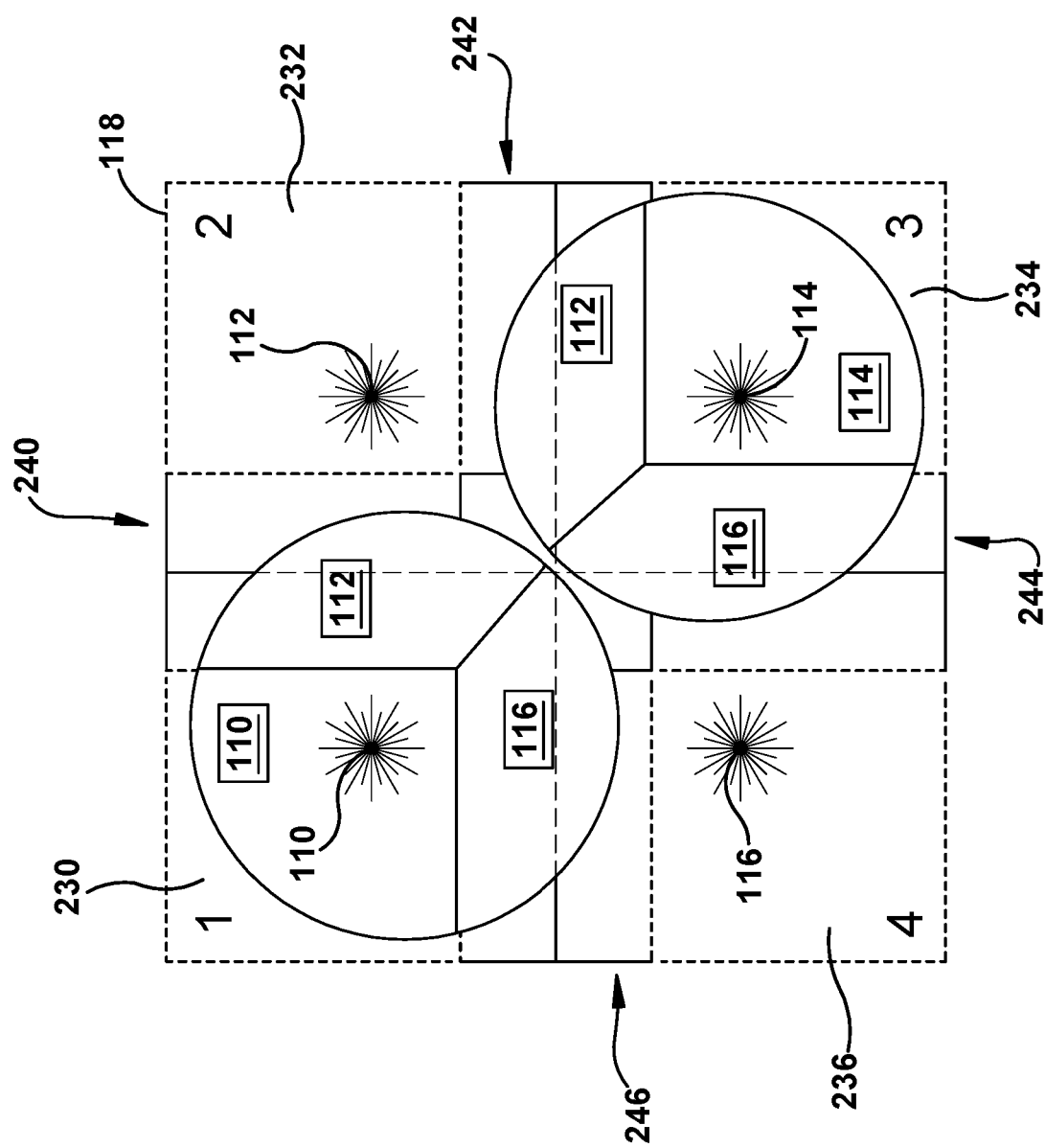
FIG. 3 shows a schematic plan view of respective fields of a four irradiation device additive manufacturing system.

As an introduction, FIGS. 1-3 show an illustrative additive manufacturing system and a number of AM processes. FIG. 1 shows a schematic/block view of an illustrative computerized metal powder additive manufacturing system 100 (hereinafter 'AM system 100') for generating an object(s) 102, which may include one large object or multiple objects, e.g., two objects 102A, 102B as shown, of which only a single layer is shown. Embodiments of the disclosure may be described relative to building object(s) 102 using an irradiation beam source system 117 having multiple irradiation devices, e.g., four lasers, but it is emphasized and will be readily recognized that the teachings of the disclosure are equally applicable to build multiple object(s) 102 using a system 117 having any number of irradiation devices, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. Object(s) 102 are illustrated as circular elements; however, it is understood that the additive manufacturing process can be readily adapted to manufacture any shaped object, a large variety of objects and a large number of objects on a build platform 118.

AM system 100 generally includes a metal powder additive manufacturing control system 120 ("control system") and an AM printer 122. As will be described, control system 120 executes object code 124O to generate object(s) 102 using one or more irradiation devices 110, 112, 114, 116 of an irradiation beam source system 117 of AM printer 122. In the example shown, four irradiation devices may include four lasers. However, the teachings of the disclosures are applicable to any irradiation device capable of creating a melting beam, e.g., an electron beam, laser beam, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes program code 124 to generate object(s) 102. Program code 124 can include, inter alia, a set of computer-executable instructions (herein referred to as 'system code 124S') for operating AM printer 122 or other system parts, and a set of computer-executable instructions (herein referred to as 'object code 124O') defining object(s) 102 to be physically generated by AM printer 122. As described herein, additive manufacturing processes begin with a non-transitory computer readable storage medium (e.g., memory 130, storage system 132, etc.) storing program code 124. System code 124S for operating AM printer 122 may include any now known or later developed software code capable of operating AM printer 122. In accordance with embodiments of the disclosure, code 124 may include duration controller 192 (part of and/or interactive with control system 120) for controlling operation of AM printer 122, as will be described herein.

Object code 124O defining object(s) 102 may include a precisely defined 3D model of an object and can be generated from any of a large variety of well-known computer aided design (CAD) software systems such as AutoCAD®, TurboCAD®, DesignCAD 3D Max, etc. In this regard, object code 124O can include any now known or later developed file format. Furthermore, object code 124O representative of object(s) 102 may be translated between different formats. For example, object code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Object code 124O representative of object(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and object code 124O, dividing object(s) 102 into a series of thin slices that assembles using AM printer 122 in successive layers of material.

AM printer 122 may include a processing chamber 142 that is sealed to provide a controlled atmosphere for object(s) 102 printing, e.g., a set pressure and temperature for lasers, or a vacuum for electron beam melting. A build platform 118, upon which object(s) 102 is/are built, is positioned within processing chamber 142. Irradiation beam source system 117 may include a number of irradiation devices 110, 112, 114, 116 configured to melt layers of metal powder on build platform 118 to generate object(s) 102. While four irradiation devices 110, 112, 114, 116 will be described herein, it is emphasized that the teachings of the disclosure are applicable to a system employing any number of sources, e.g., 1, 2, 3, or 5 or more.

FIG. 2 shows a schematic perspective view of melting beams of AM system using two irradiation devices 110, 112, e.g., lasers. During operation, the melting beam(s) (dashed lines) are guided, e.g., by scanner mirrors for lasers or electromagnetic field/electric coils for electron beams, along scan vectors (paths), which are indicated by arrows on a top surface of illustrative object 102. Internal scan vectors 202 melt inner regions 204 of object 102 that scan linearly across a layer, and a very thin border 206 is melted with one to three contour scan vectors 208 that only follow a desired outer edge of the layer. Each laser has its own field (left and right of interface 210), respectively) upon which it can work. Each irradiation device 110, 112 may work within only a small portion of its respective field at any given time. Each field and the scan vectors are assigned to one or the other device 110, 112 with an interface 210 (within circle) where fields 1, 2 of pair of devices 110, 112 meet. Which scan vector is made by which source usually depends on the region that can be reached by each source. Each irradiation device 110, 112 is calibrated in any now known or later developed manner. That is, each irradiation device 110, 112 has had its laser or electron beam's anticipated position relative to build platform 118 correlated with its actual position in order to provide an individual position correction (not shown) to ensure its individual accuracy. Interface 210 in body 222 of object 102 defines a first portion 224 and a second portion 226 of body 222 made by different irradiation devices 110, 112 of multiple irradiation device AM system 100 during a single build. Here, fields 1, 2 meet at a line, creating a planar interface 210 in object 102.

FIG. 3 shows a schematic plan view of melting beams of AM system 100 using four irradiation devices 110, 112, 114, 116, e.g., lasers. Each irradiation device 110, 112, 114, 116 has a field 1, 2, 3 or 4 including a non-overlapping field region 230, 232, 234, 236, respectively, in which it can exclusively melt metal powder, and at least one overlapping field region or interfaces 240, 242, 244, 246 in which two or more sources can melt metal powder. However, other configurations with different overlap of the laser scan fields are possible as well. In the example shown in FIG. 3, boxed numbers of devices 110, 112, 114, 116 indicate which device creates the shape illustrated thereabout. In this regard, each irradiation device 110, 112, 114, 116 may generate a melting beam (two shown, 160, 162, in FIG. 1), respectively, that fuses particles for each slice, as defined by object code 124O. For example, in FIG. 1, irradiation device 110 is shown creating a layer of object 102 using melting beam 160 in one region, while irradiation device 112 is shown creating a layer of object 102 using melting beam 162 in another region. (Any mirrors have been omitted for clarity). Each irradiation device 110, 112, 114, 116 is calibrated in any now known or later developed manner. That is, each irradiation device 110, 112, 114, 116 has had its laser or electron beam's anticipated position relative to build platform 118 correlated with its actual position in order to provide an individual position correction (not shown) to ensure its individual accuracy. In one embodiment, each of plurality irradiation devices 110, 112, 114, 116 may create melting beams, e.g., 160, 162 (FIG. 1), having the same cross-sectional dimensions (e.g., shape and size in operation), power and scan speed. It is recognized that while four devices 110, 112, 114, 116 have been illustrated to describe an interface for overlapping fields, any two sources may create overlapping fields.

Returning to FIG. 1, an applicator 164 may create a thin layer of raw material 166 spread out as the blank canvas from which each successive slice of the final object will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 take a variety of forms. In one embodiment, applicator 164 may include a body 176 configured to move along opposing rails 170, 172, and an actuator element (not shown in FIG. 1) in the form of a tip, blade or brush configured to spread metal powder evenly over build platform 118, i.e., build platform 118 or a previously formed layer of object(s) 102, to create a layer of raw material. The actuator element may be coupled to body 176 using a holder (not shown) in any number of ways. The process may use different raw materials in the form of metal powder. Raw materials may be provided to applicator 164 in a number of ways. In one embodiment, shown in FIG. 1, a stock of raw material may be held in a raw material source 178 in the form of a chamber accessible by applicator 164. In other arrangements, raw material may be delivered through applicator 164, e.g., through body 176 in front of its applicator element and over build platform 118. In any event, an overflow chamber 179 may be provided on a far side of applicator 164 to capture any overflow of raw material not layered on build platform 118. In FIG. 1, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, object(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). In another example, the metal may include practically any reactive metal such as but not limited to those known under their brand names: Inconel 738, IN738LC, Rene 108, FSX 414, X-40, X-45, MarM 247, MAR-M509, MAR-M302, CM247 or Merl 72/Polymet 972, some of which may be classified as a gamma prime hardened superalloy.

The atmosphere within processing chamber 142 is controlled for the particular type of irradiation device being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182 and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142. Control system 120 also controls AM printer 122, and in particular, applicator 164 (e.g., linear actuator 174) and irradiation device(s) 110, 112, 114, 116 to sequentially melt layers of metal powder on build platform 118 to generate object(s) 102 according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

As indicated above, embodiments of the disclosure control microstructures of objects formed during AM, using AM system 100 including duration controller 192 (FIG. 1). In contrast to conventional approaches that provide complex temperature controls and/or complex irradiation device operational parameter changes during a build, embodiments of the disclosure use constant operational parameters for the irradiation devices and maintain an irradiation device melting time, an irradiation device idle time and a recoating time consistent for a selected range of layers of the object(s), where homogeneous microstructure is desired.

Figure 4:
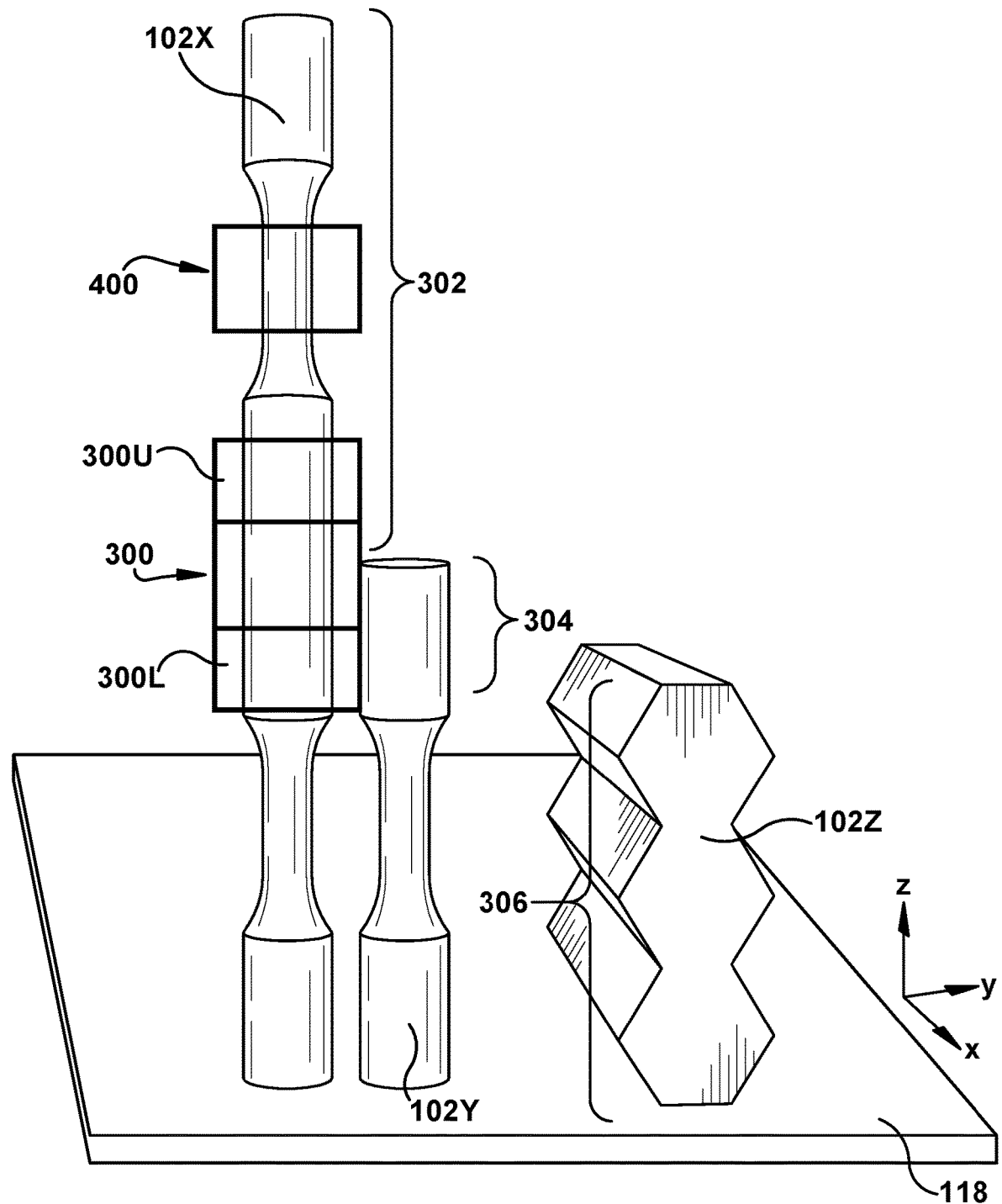
FIG. 4 shows a perspective view of a number of illustrative objects formed according to embodiments of the disclosure.

With reference to FIGS. 4 and 5, a methodology according to embodiments of the disclosure will be described. As described previously relative to FIG. 1, embodiments of the disclosure provide AM system 100 including an irradiation beam source system 117 for manufacturing a selected object(s) 102 by successive solidification of metal powder material layers using irradiation on positions corresponding to a cross-sectional area of one or more objects in each layer including selected object(s) 102. Irradiation beam source system 117 includes at least one irradiation device 110, 112, 114, 116 for irradiating portions each metal powder material layer to form the one or more objects in each layer including selected object 102. Each irradiation device 110, 112, 114, 116 is separately actuatable to irradiate the metal powder material. Embodiments of the disclosure can be applied to AM systems 100 including a single irradiation device or any number of irradiation devices.

Figure 6:
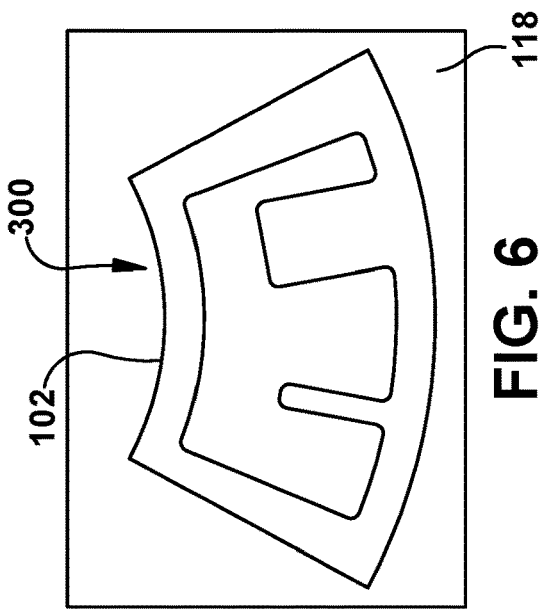
FIG. 6 shows a top down view of an illustrative larger object according to embodiments of the disclosure.

FIG. 4 shows a perspective view of illustrative objects 102X, 102Y and 102Z on a build platform 118. FIG. 4 also has an indicator to identify an illustrative selected range 300 of layers of selected object(s) 102, e.g., object 102X, where homogeneous microstructure is desired. "Selected range of layers" as used herein means at least two layers having a cross-sectional area of any object. In FIG. 4, example selected range 300 of layers includes a lower portion 300L in a lower region of object 102X, and an upper portion 300U in an upper region 302 of object 102X. The number of objects built across each layer in a selected range 300 may vary over the build height, i.e., z-axis. For example, each layer in lower portion 300L has a number of objects 102X, 102Y, 102Z built therein, while each layer in upper portion 300U has only one object, selected object 102X, built therein. While object 102X has very similar, if not identical, cross-sectional area in each portion 300L, 300U of selected range 300 so it takes the same amount of time to build, this is not necessarily the case in all instances. Each selected range of layers may be of concern due to, for example, high residual stress created by any number of factors such as but not limited to: complexity of shape, dimensions (x or y), structure above or below, proximity to an edge of the object, etc. As noted, each layer in a selected range of layers may include any number of objects therein. For example, layers of upper region 300U of selected range 300 include an entire cross-sectional area of one, smaller object 102X, e.g., upper portion 300U requires building the entire, smaller cross-sectional area of object 102X in layers in upper region 302. In contrast, lower portion 300L of selected range 300 includes a cross-sectional area of object(s) 102X, 102Y and 102Z, which requires longer irradiation device melting times for that range. Alternatively, as shown in the top down view of a larger object 102 in FIG. 6, a selected range 300 (into/out of page) of layers may include the cross-sectional area of a single, larger object(s), which alone requires relatively longer irradiation device melting times to build.

FIG. 4 also shows, for reference purposes, an upper region 302 of object 102X, an upper region 304 of object 102Y and a region 306 that includes an entirety of object 102Z. FIG. 5 shows a chart indicating irradiation device melting time per layer in seconds versus build-up direction height (Z), i.e., layer height. As used herein, "irradiation device melting time" means a duration expended melting a cross-sectional area of one or more objects in a layer N. In one embodiment, AM system 100 may include a single irradiation device, e.g., 110. In this case, the irradiation device melting time equals a duration expended melting the cross-sectional area of the one or more objects in each respective layer of the selected range of layers, i.e., by single irradiation device 110. In other embodiments, AM system 100 may include a plurality of irradiation devices, e.g., 110, 112, 114, 116. In this case, the irradiation device melting time equals a duration expended melting each respective layer of the selected range of layers including the cross-sectional area of the one or more objects including the selected object 102 from a start time of a first operating one of the plurality of irradiation devices to an end time of a last operating one of the plurality of irradiation devices. In FIG. 5, the irradiation device melting time of layers for each portion 300U, 300L of selected range 300 are called out with boxes, and the irradiation device melting time of regions 302, 304, 306 are called out with brackets. As shown, each layer of an object within a selected range 300 can see different melting durations and, accordingly, are exposed to different local thermal cycles. The varying local thermal cycles leads to different local microstructures within the object, and consequently their related residual stresses. Each object 102X, 102Y, 102Z thus can have inhomogeneous material properties along the build height.

In contrast to conventional approaches, embodiments of the disclosure simplify how inhomogeneous microstructures are addressed by considering the influence of durations on local microstructure formation within each object. In particular, in addition to irradiation device melting time, layers within a selected range 300 (e.g., each portion 300L, 300U), may also observe different irradiation device idle times. As used herein, "irradiation device idle time" means a duration expended during which all irradiation devices 110, 112, 114, 116 (being employed) are inoperative between completion of melting of all sections of the cross-sectional area of the one or more objects in the same respective layer. During this idle time, some of the cross-sectional areas sit and change in thermal status, i.e., typically cooling. For example, for a small cylindrical selected object 102X built using, e.g., DMLM, with other objects 102Y, 102Z, each layer in lower portion 300L of selected range of layers 300 may have an irradiation device melting time of 200 seconds and an irradiation device idle time of 5 seconds (the irradiation device idle time is typically as short as possible, and can be zero seconds). The irradiation device idle time may be relatively low because irradiation device(s) of AM system 100 is working on other objects 102Y, 102Z in each layer in lower portion 300L of selected range 300. In contrast, in upper portion 300U of selected range 300, object 102X has the same shape/size as in lower portion 300L of selected range 300, but a lower number of other objects are being built in upper portion 300U. Thus, an irradiation device melting time (for same shape of 300U) may be 5 seconds for each layer, but the irradiation device melting time is significantly lower for the layers in upper portion 300U because objects 102Y and 102Z are not being formed in the upper layers of object 102X. Here, under conventional operating procedures, AM system 100 may progress to another layer, making an irradiation device idle time for each layer in upper portion 300U of selected range 300 very low or non-existent, i.e., because AM system 100 is moving on to build the next layer. Here, the amount of time each layer in upper portion 300U of selected range 300 has to cool is much lower than for layers in lower region 300L of selected range, resulting in different microstructure for each portion within selected range 300.

Another duration that impacts microstructure is a recoating time. As used herein, "recoating time" is a duration expended during which applicator 164 (FIG. 1) recoats, i.e., creates, a new thin layer of raw material 166 (FIG. 1) spread out as the blank canvas from which each successive layer of the final object will be created. That is, it is the time expended applying a new powder material layer. As noted, applicator 164 (FIG. 1) may move under control of linear transport system 168 (FIG. 1). In many cases, recoating time remains constant, but it can vary depending on, e.g., AM system 100, number of objects in each layer, thickness of metal powder material in each layer, etc. Any change in recoating time can also impact the microstructure of object(s) 102.

As noted, a post-manufacture heat treatment may not be able to homogenize the differences created by the different durations described. Embodiments of the disclosure address the issues created by the above discovery by controlling the durations noted herein using duration controller 192 (FIG. 1). In particular, during additive manufacturing of selected object(s) 102 using irradiation beam source system 117, for each respective layer in a selected range 300 of layers including a cross-sectional area of the one or more objects including selected object(s) 102, duration controller 192 controls actuation of each irradiation device 110, 112, 114, 116. In particular, duration controller 192 controls actuation of each irradiation device 110, 112, 114, 116 to maintain constant a sum of: irradiation device melting time, irradiation device idle time, and recoating time, while otherwise maintaining all other operation parameters of each irradiation device 110, 112, 114, 116 constant, i.e., within +/−5% of their previous value. "Operation parameters" as used herein means: a beam power, a beam scan speed, a size of a beam focal point, a lateral displacement between successive scan vectors (i.e., hatch distance), a vertical distance between two successive layers (i.e., powder layer thickness), a beam pulse frequency and a beam pulse duration. In order to attain the desired sum, duration controller 192 may add pauses in operation, e.g., where one or more irradiation devices is/are kept idle in a layer(s). That is, it turns one or more of the irradiation devices off. Alternatively, duration controller 102 can change the number of irradiation devices used, or which irradiation device is used for a selected section in a layer.

Figure 7:
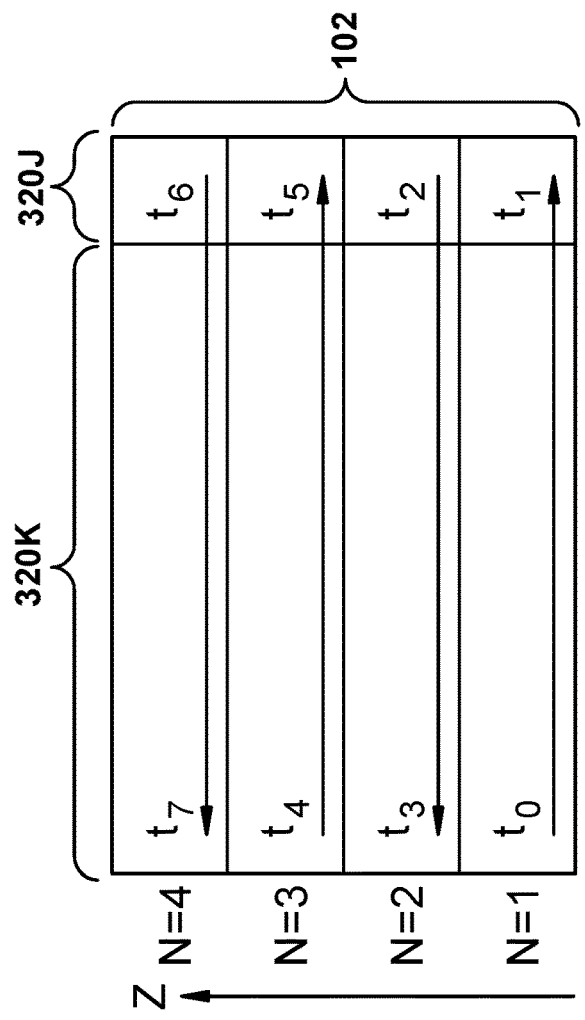
FIG. 7 shows a side view of an illustrative object showing several exposed layers including a number of selected sections according to embodiments of the disclosure.

With regard to the latter options, referring to FIG. 7, embodiments of the disclosure may find additional benefits when applied to a multiple irradiation device AM system 100. In particular, multiple irradiation device systems are covering more field with each irradiation device, approaching in some cases up to the total field with each irradiation device. In this regard, duration controller 192 can control which irradiation devices are doing work to obtain desired grain microstructure. For example, duration controller 192 can be configured to use one irradiation device 110 for a selected section 320J in one layer N and greater than one irradiation device 110, 112, 114, 116 for selected section 320J in other layers, e.g., layers N+1, N+2, etc., to keep the sum of irradiation device melting time, irradiation device idle time and recoating time constant. That is, duration controller 192 maintains the sum constant by changing a number of irradiation devices used to additively manufacture at least one selected section of one or more objects in a respective layer. Further, in addition to or alternatively to using different numbers of irradiation devices, duration controller 192 can be configured to use a different irradiation device(s) for a selected section 320K in different layers, e.g., N, N+1, N+2, etc., to keep the sum of irradiation device melting time, irradiation device idle time and recoating time constant for a selected range of layers. That is, duration controller 192 controls which irradiation device is used to additively manufacture at least one selected section 320K of one or more objects 102 in a respective layer. For example, irradiation device 110 may create selected section 320K in layer N, and irradiation device 112 may create selected section 320K in layers N+1, N+2, etc. One of the irradiation devices 110, 112 can be chosen over another for any number of reasons, e.g., speed, power, proximity to selected section, etc. In an additional embodiment of the disclosure, more than one selected range of layers can be chosen for a selected, single object 102 to allow customization of microstructure through having different constant sums of irradiation device melting time, irradiation device idle time and recoating, while otherwise maintaining the operation parameter of AM system 100 constant. For example, returning to FIG. 4, a selected object, e.g., object 102X, may have first selected range of layers 300, as previously described, covering one section (thicker as shown) thereof, and a second, different selected range of layers 400 covering another section (thinner) thereof. Here, duration controller 192 may use a first constant sum for selected range of layer 300, and a second, different constant sum for selected range of layers 400. That is, duration controller 192 controls actuation of each irradiation device 110, 112, 114, 116 to maintain constant: a first sum for the first selected range of layers 300 and a second, different sum for the second, different range of layers 400. Each of the first sum and the second, different sum for each layer in the respective first and second, different range of layers, is calculated as described herein, i.e., as the sum of: the irradiation device melting time, the irradiation device idle time, and the recoating time expended applying the new powder material layer, while otherwise maintaining all other operation parameters of each irradiation device constant. The different sums can be generated in any fashion described herein such as but not limited to using different numbers of irradiation devices for each range of layers 300, 400 to, for example, increase or decrease irradiation device melting time between the two range of layers 300, 400. Any numerical range of layers can be provided for a selected object 102, and more than one selected object can be selected for a build. In this fashion, in addition to controlling microstructure of each section, duration controller 192 may also allow for a preheating of selected range of layers during the DMLM processing of object 102, which may be beneficial to reduce residual stresses in object 102. This process can, for example, reduce strain age cracking (SAC) sensitivity for high strength alloys by minimizing cool down time in critical areas (i.e., range of layers) and create a preheating effect during the DMLM processing of the critical areas leading to reduced residual stresses.

Returning to the FIG. 4 example to explain operation of duration controller 192, as noted, irradiation device idle time can vary drastically between layers depending on number of parts, size of part(s), etc. For example, for a small cylindrical selected object 102X built using, e.g., DMLM, with other objects 102Y, 102Z, each layer in lower portion 300L of selected range of layers 300 may have an irradiation device melting time of 200 seconds and an irradiation device idle time of 5 seconds. A recoating time may be, for example, 10 seconds, for a sum of 215 seconds, i.e., 200 seconds melting, 5 seconds idle and 10 seconds recoating. As noted, the irradiation device idle time may be relatively low in lower portion 300L because irradiation device(s) of AM system 100 is working on other objects 102Y, 102Z in each layer in lower portion 300L of selected range 300. In contrast, selected object 102X in upper portion 300U of selected range 300 has a lower number of other objects being built at that vertical region and thus has a lower melting time. For example, an irradiation device melting time may be 5 seconds (same shape) for object 102X in upper portion 300U. Under conventional operating procedures, AM system 100 may progress to another layer, making an irradiation device idle time for each layer in upper portion 300U of selected range 300 very low or non-existent, i.e., because AM system 100 is moving on to build the next layer. Here, assuming the recoating time does not change, duration controller 192 may increase the amount of irradiation device idle time for each layer in upper portion 300. For example, duration controller 192 may insert pauses in operation, during a build of upper portion 300U of selected range 300, to increase the idle time to 200 seconds, thus maintaining the sum constant at 215 seconds for each layer in selected range 300, i.e., 5 seconds melting, 200 seconds idle, and 10 seconds recoating. In this manner, the time each layer in upper region 300U of selected range 300 has to cool is the same as or nearly the same as that for each layer in lower region 300L of selected range 300. The result is that they have substantially similar microstructure in each portion and within selected range 300. Similar results to achieve different microstructure can be achieved in some instances by decreasing idle time, increasing or decreasing melting time and/or increasing or decreasing recoating time.

After additive manufacturing, methods according to embodiments of the disclosure include performing a heat treatment to selected object(s) 102 to remove residual stress and to achieve a desired microstructure. The heat treatment may include any now known or later developed post-AM heat treatment, which may depend on a wide variety of parameters such as but not limited to: material used, size of object(s), shape of object(s), etc. In one embodiment, the heat treatment may be performed under isostatic pressure (HIP). It is noted that embodiments of the disclosure may be applied to build an entire object 102 from start to finish. Alternatively, embodiments of the disclosure may be applied additively manufacturing the selected object on a preform. That is, selected object 102 can be a hybrid object, where the additive volume is built on an existing preform. The preform can be built using either conventional manufacturing, e.g., casting, machining, etc., or by a separate additive manufacturing process.

Embodiments of the disclosure differ from conventional approaches in achieving homogeneous microstructures/mechanical properties for the entire part by ensuring a consistent sum of the irradiation device melting time, irradiation device idle time and recoating time. The process is simpler than continually changing AM system 100 operation parameters.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for controlling microstructure in a selected object created by metal powder additive manufacturing (AM), the method comprising:
   providing an AM system including an AM printer having an irradiation beam source system for manufacturing the selected object by successive solidification of metal powder material layers using irradiation on positions corresponding to a cross-sectional area of one or more objects in each layer including the selected object, the irradiation beam source system including at least one irradiation device for irradiating portions of each metal powder material layer to form the one or more objects in each layer including the selected object, each irradiation device separately actuatable to irradiate the metal powder material; and
   during additive manufacturing using the irradiation beam source system, for each respective layer in a selected range of layers including a cross-sectional area of the one or more objects including the selected object, controlling actuation of each irradiation device to maintain constant a sum of: an irradiation device melting time, an irradiation device idle time, and a recoating time expended applying a new powder material layer, while otherwise maintaining all other operation parameters of each irradiation device constant.

2. The method of claim 1, wherein the at least one irradiation device includes a single irradiation device, and the irradiation device melting time equals a duration expended melting the cross-sectional area of the one or more objects in the layer.

3. The method of claim 1, wherein the at least one irradiation device includes a plurality of irradiation devices, and the irradiation device melting time equals a duration expended melting each respective layer of the selected range of layers including the cross-sectional area of the one or more objects including the selected object from a start time of a first operating one of the plurality of irradiation devices to an end time of a last operating one of the plurality of irradiation devices.

4. The method of claim 1, wherein the irradiation device idle time equals a duration expended during which all irradiation devices are inoperative between completion of melting of all sections of the cross-sectional area of the one or more objects in the same respective layer.

5. The method of claim 1, wherein the controlling actuation of each irradiation device to maintain constant the sum includes changing a number of irradiation devices used to additively manufacture at least one selected section of one or more objects in a respective layer.

6. The method of claim 1, wherein the controlling actuation of each irradiation device to maintain constant the sum includes changing which irradiation device is used to additively manufacture at least one selected section of one or more objects in a respective layer.

7. The method of claim 1, wherein the operation parameters consists of: a beam power, a beam scan speed, a lateral displacement between successive scan vectors, a vertical distance between two successive layers, a size of a beam focal point, a beam pulse frequency and a beam pulse duration.

8. The method of claim 1, further comprising performing a heat treatment to the object.

9. The method of claim 1, wherein the additive manufacturing includes additively manufacturing the selected object on a preform.

10. The method of claim 1, wherein the selected range of layers includes a first selected range of layers within a selected object and a second, different selected range of layers within the selected object, wherein the controlling actuation of each irradiation device includes maintaining constant: a first sum for the first selected range of layers and a second, different sum for the second, different range of layers,
wherein each of the first sum and the second, different sum include, for each layer in the respective first and second, different range of layers, the sum of: the irradiation device melting time, the irradiation device idle time, and the recoating time expended applying the new powder material layer, while otherwise maintaining all other operation parameters of each irradiation device constant.

11. An additive manufacturing (AM) system, the (AM) system comprising:
an irradiation beam source system for manufacturing one or more objects including a selected object by successive solidification of metal powder material layers using irradiation on positions corresponding to a cross-sectional area of the one or more objects in each layer, the irradiation beam source system including at least one irradiation device for irradiating portions each metal powder material layer to form the one or more objects in each layer including the selected object, each irradiation device separately actuatable to irradiate the metal powder material; and
a duration controller controlling actuation of each irradiation device, for each respective layer in a selected range of layers including a cross-sectional area of the one or more objects including the selected object, controlling actuation of each irradiation device to maintain constant a sum of: an irradiation device melting time, an irradiation device idle time, and a recoating time expended applying a new powder material layer, while otherwise maintaining all other operation parameters of each irradiation device constant.

12. The AM system of claim 11, wherein the at least one irradiation device includes a single irradiation device, and the irradiation device melting time equals a duration expended melting the cross-sectional area of the one or more objects in the layer.

13. The AM system of claim 11, wherein the at least one irradiation device includes a plurality of irradiation devices, and the irradiation device melting time equals a duration expended melting each respective layer of the selected range of layers including the cross-sectional area of the one or more objects including the selected object from a start time of a first operating one of the plurality of irradiation devices to an end time of a last operating one of the plurality of irradiation devices.

14. The AM system of claim 11, wherein the irradiation device idle time equals a duration expended during which all irradiation devices are inoperative between completion of melting of all sections of the cross-sectional area of the one or more objects in the same respective layer.

15. The AM system of claim 11, wherein the duration controller controls a number of irradiation devices used to additively manufacture at least one selected section of one or more objects in a respective layer.

16. The AM system of claim 11, wherein the duration controller controls which irradiation device is used to additively manufacture at least one selected section of one or more objects in a respective layer.

17. The AM system of claim 11, wherein the operation parameters consists of: a beam power, a beam scan speed, a lateral displacement between successive scan vectors, a vertical distance between two successive layers, a size of a beam focal point, a beam pulse frequency and a beam pulse duration.

18. The AM system of claim 11, wherein the selected range of layers includes a first selected range of layers within a selected object and a second, different selected range of layers within the selected object, wherein the duration controller controls actuation of each irradiation device to maintain constant a first sum for the first selected range of layers and a second, different sum for the second, different range of layers,
wherein each of the first sum and the second, different sum include, for each layer in the respective first and second, different range of layers, the sum of: the irradiation device melting time, the irradiation device idle time, and the recoating time expended applying the new powder material layer, while otherwise maintaining all other operation parameters of each irradiation device constant.

* * * * *